United States Patent [19]

Kim

[11] Patent Number: 5,501,083
[45] Date of Patent: Mar. 26, 1996

[54] CONTROL APPARATUS AND METHOD FOR AN AIR CONDITIONER COMPRESSOR

[75] Inventor: Tae D. Kim, Suwon, Rep. of Korea

[73] Assignee: Samsung Electronics Co., Ltd., Suwon, Rep. of Korea

[21] Appl. No.: 313,582

[22] Filed: Sep. 27, 1994

[30] Foreign Application Priority Data

Oct. 19, 1993 [KR] Rep. of Korea .................. 1993-21704

[51] Int. Cl.$^6$ ..................................... F25B 27/00
[52] U.S. Cl. .............. 62/228.4; 62/230; 62/236; 62/235.1; 307/64; 323/906
[58] Field of Search .......... 62/230, 236, 228.4, 62/228.1, 158, 231, 235.1; 323/906; 307/20, 21, 22, 24, 25, 26, 64, 66, 23

[56] References Cited

U.S. PATENT DOCUMENTS

| | | | |
|---|---|---|---|
| 2,194,822 | 3/1940 | Dannheiser | 307/22 X |
| 3,976,458 | 8/1976 | Krug | 62/236 X |
| 4,367,633 | 1/1983 | Strathman | 62/236 |
| 4,474,028 | 10/1984 | Miller et al. | 62/236 X |
| 4,697,136 | 9/1987 | Ishikawa | 323/906 X |
| 4,725,740 | 2/1988 | Nakata | 307/64 |
| 4,750,102 | 6/1988 | Yamano et al. | 323/906 X |
| 5,056,330 | 10/1991 | Isobe et al. | 62/228.4 X |
| 5,200,644 | 4/1993 | Kobayashi et al. | 307/66 |
| 5,375,429 | 12/1994 | Tokizaki et al. | 62/230 X |

FOREIGN PATENT DOCUMENTS

| | | |
|---|---|---|
| 4-198648 | 7/1992 | Japan . |
| 2164433 | 3/1986 | United Kingdom ............. 62/236 |

*Primary Examiner*—Harry B. Tanner
*Attorney, Agent, or Firm*—Burns, Doane, Swecker & Mathis

[57] ABSTRACT

A compressor of a refrigeration cycle is normally driven by a commercial power source. During a power failure, the compressor is driven by an auxiliary solar power source, wherein the compressor is initially driven at a minimum frequency for a delay period and is thereafter driven at a higher frequency.

7 Claims, 3 Drawing Sheets

CONTROL APPARATUS AND METHOD FOR AN AIR CONDITIONER COMPRESSOR

BACKGROUND OF THE INVENTION

1. Field of the Invention

The present invention is related to a control apparatus and control method for an air conditioner employing two power sources, and particularly to a control apparatus and control method for an air conditioner for making the air conditioner operate continuously without any overstrain regardless of a momentary power failure in commercial A.C. power source.

2. Description of the Prior Art

Recently, there have been developed various kinds of electric appliances employing an additional independent power source utilizing solar heat as an energy source, besides commercial A.C. power source for the purpose of energy conservation. As a good example, an air conditioner employing two power sources is fully disclosed in Japanese patent laid-open publication No. 198648 (1992. 9. 20). The disclosed air conditioner adds D.C. power obtained from solar cells to another D.C. power converted from a commercial A.C. power source, converts the D.C. power into A.C. power with a variable frequency, and then drives a compressor motor with the converted A.C. power.

At this time, a possible damage of the compressor motor due to an overcurrent may be prevented by appropriately varying the frequency of the converted A.C. power in order that the current may not exceed a predetermined reference value.

On the other hand, there may frequently occur an irregularity in the commercial A.C. power source, such as a momentary power interruption or voltage drop. Such irregularity of the power source is usually restored within a short time such as tens of milliseconds.

Here, the compressor motor comes to a stop as soon as some irregularity occurs in the commercial A.C. power source, and assumes a re-starting mode the moment the irregularity of the commercial A.C. power source is eliminated.

At this time, a larger torque, that is, a larger current is required to re-start the compressor motor, because the pressure difference between the inlet and outlet of the compressor becomes great due to the operation before stoppage. As a result, the life span of the compressor may be shortened due to the large current.

To protect the compressor, the conventional air conditioner delays the re-starting action of the compressor motor until the pressure difference between the inlet and outlet of the compressor disappears. Such a delay time usually reaches up to three minutes, thereby resulting in a great nuisance to the user.

SUMMARY OF THE INVENTION

It is an object of the present invention to provide a control apparatus and method for an air conditioner, which is operative with two power sources and has a compressor with a variable operation frequency, for making the compressor operate continuously without any overstrain regardless of a momentary power failure in commercial A.C. power source.

It is another object of the present invention to provide a control apparatus and method for an air conditioner, which is operative with two power sources and has a compressor with a variable operation frequency, for providing an agreeable environment for the user by continuously operating the compressor regardless of a momentary power failure in commercial A.C. power source.

To achieve these objects, the control apparatus for an air conditioner comprises a compressor forming a part of a refrigerating cycle; a means for generating a first D.C. power by rectifying and then smoothing commercial A.C. power source; a means for generating a second D.C. power; an invertor means for converting the first or second D.C. power into A.C. power with a variable frequency and operating the compressor with the converted A.C. power; a means for detecting occurrence of power failure in commercial A.C. power source; a means for detecting output voltage of the second D.C. power; and, a control means for connecting the second D.C. power to the invertor means to continuously drive the compressor when the magnitude of the output voltage of the second D.C. power is than a predetermined reference voltage although power failure occurs in commercial A.C. power source.

In the control apparatus described above, the second D.C. power generating means includes a solar cell module, a DC to DC convertor for stepping D.C. voltage from the solar cell module up/down to D.C. voltage suitable for operating the air conditioner; and, a switch means for connecting or disconnecting the stepped up/down D.C. power with the invertor means according to the signal from the control means.

On the other hand, the control method according to the present invention can be adapted to an air conditioner which converts a first D.C. power obtained by rectifying and smoothing commercial A.C. power source or a second D.C. power into A.C. power with a variable frequency and then drives the compressor with the converted A.C. power source.

The control method comprises the steps of (a) determining whether or not the output voltage (V1) of the first D.C. power is higher than a first reference voltage (Vs1) capable of driving the compressor at the minimum frequency (Fmin) if power failure occurs in commercial A.C. power source; (b) determining whether or not the output voltage (V2) of the second D.C. power is higher than the first reference voltage (Vs1) if the output voltage (V1) is lower than the first reference voltage (Vs1) in step (a); (c) driving the compressor at the minimum frequency (Fmin) if the output voltage (V2) is higher than the first reference voltage (Vs1) in step (b); and, (d) driving the compressor at the set frequency (Fset) after a first delay time (t1) elapses.

In the step (d), the first delay time (t1) is given to prevent the overstrain of the compressor which may occur according as the operation frequency of the compressor rapidly changes from the minimum value to the set value.

Furthermore, if the voltage (V1) is higher than the first reference voltage (Vs1) in step (a), in other words, a momentary power failure less than a predetermined time period occurs in commercial A.C. power source, it is possible to drive the compressor with the first D.C. power more stable than the second D.C. power by directly performing step (c) after step (a).

Furthermore, if the first and second output voltages (V1 and V2) are both lower than the first reference voltage (Vs1), the operation of the compressor is interrupted for a second delay time (t2). The compressor may then be driven at the set operation frequency (Fset) if normal operation of the compressor is possible after the lapse of the second delay time (t2). Herein, the second delay time (t2) is given to prevent the overstrain of the compressor which may occur according as the operation frequency of the compressor rapidly changes from zero to the set value. Therefore, the second delay time (t2) is necessarily greater than the first delay time (t1).

BRIEF DESCRIPTION OF THE DRAWINGS

The present invention will become more readily apparent from the following description in connection with the accompanying drawings wherein.

DETAILED DESCRIPTION OF THE PREFERRED EMBODIMENT

For a better understanding of the present invention, together with other and further objects, advantages and capabilities thereof, reference is made to the following disclosure in connection with the abovedescribed drawings.

Figure 1:
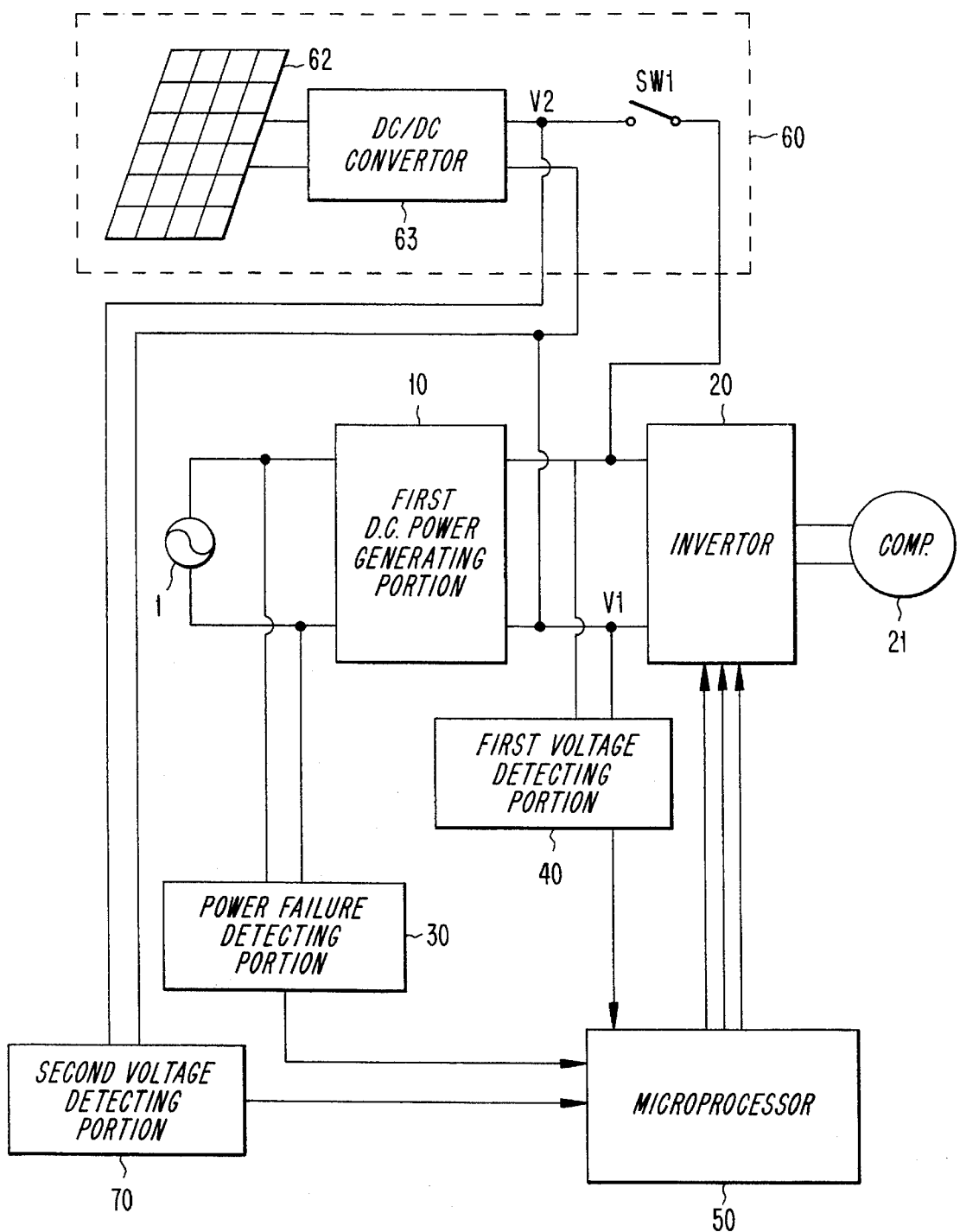
FIG. 1 is a block diagram illustrating a control apparatus for an air conditioner according to the preferred embodiment of the present invention; and, FIGS. 2(A) and (B) depict a flow chart explaining a control method for an air conditioner according to the preferred embodiment of the present invention.

Referring to FIG. 1, the air conditioner control apparatus comprises a compressor 21 forming a part of a refrigerating cycle; a first D.C. power generating portion 10 for generating a first D.C. power to be used in driving the compressor 21 by rectifying and then smoothing a commercial A.C. power source 1; a second D.C. power generating portion 60 for generating a second D.C. power to be used in driving the compressor 21; a microprocessor 50 for controlling the whole operation of the air conditioner; an invertor circuit 20 converting the first or second D.C. power into A.C. power with a variable frequency and driving the compressor 21 with the converted A.C. power; a power failure detecting portion 30 for detecting the occurrence of power failure in the A.C. commercial power source 1; and, a voltage detecting portion 70 for detecting output voltage V2 of the second D.C. power and delivering it to the microprocessor 50.

In the control apparatus described above, the compressor 21 may be preferably embodied by a conventional three phase induction motor.

The first D.C. power generating portion 10 may include a diode bridge (not shown) for full-wave rectifying the output voltage of commercial A.C. power source 1 and a smoothing condenser (not shown).

The second D.C. power generation portion 60 may include a solar cell panel 62 having a plurality of solar cells, a DC to DC convertor 63 for stepping D.C. voltage from the solar cell panel 62 up/down to D.C. voltage required for operating the compressor 21; and, a switch SW1 for connecting or disconnecting the stepped up/down D.C. power with the invertor circuit 20 according to the signal from the microprocessor 50.

The invertor circuit 20 may include three pairs of power switching elements (not shown) connected to the respective phase winding of the compressor motor 21.

The power failure detecting portion 30, for example, may be embodied by a means for generating a pulse signal at each zero-cross point of time in commercial A.C. power source 1.

The microprocessor 50 may determine whether or not a power failure in commercial A.C. power source 1 occurs according to whether or not the power failure detecting portion 30 generates a pulse signal at predetermined time intervals.

The voltage detecting portion 70 lowers the output voltage V2 from the DCDC convertor 63 to a predetermined value, and then delivers the voltage signal to the microprocessor 50.

As described hereinafter, the control apparatus of the present invention may further include an additional voltage detecting portion 40 for detecting output voltage V1 of the first D.C. power and delivering it to the microprocessor 50 for the purpose of achieving a stable operation of the air conditioner. The voltage detecting portion 40 lowers the output voltage V1 to a predetermined value, and then delivers it to the microprocessor 50.

Hereinafter, the operation of the control apparatus according to the present invention will be explained in detail along with the control method of the present invention.

Figure 2A:
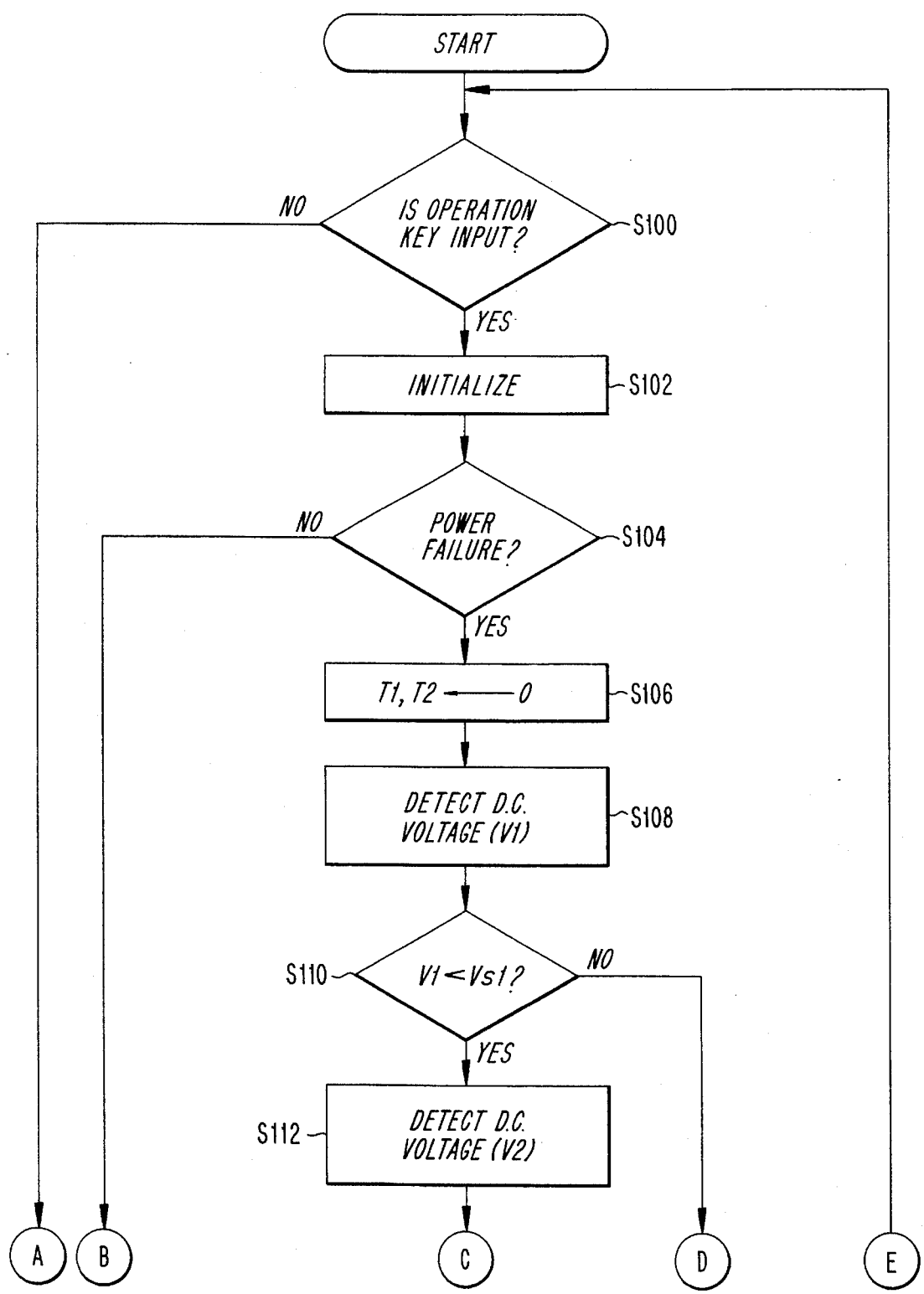
Figure 2B:
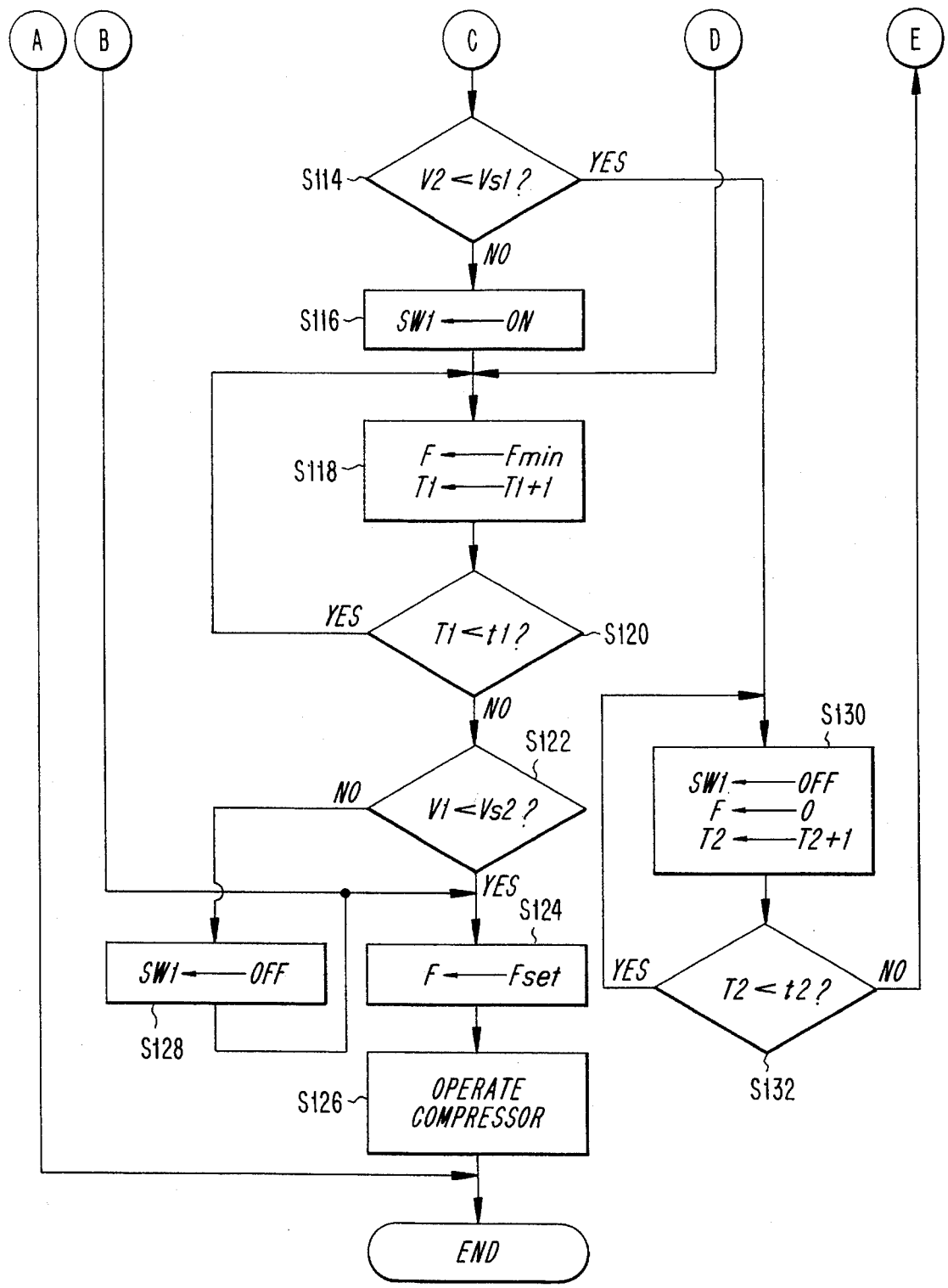

FIGS. 2(A) and (B) depict a flow chart explaining a control method for an air conditioner according to the preferred embodiment of the present invention.

In step S100, it is determined whether or not any operation key has been selected by the user. If some operation key is selected by the user in step S100, the program proceeds to step S102, in which operation of the air conditioner is initialized.

In step S104, the microprocessor 50 determines whether or not a power failure occurs in commercial A.C. power source 1 based on the pulse signal from the power failure detecting portion 30. If power failure has not occurred in the commercial A.C. power source 1, the program proceeds to step S124, in which the compressor 21 is driven at a frequency Fset corresponding to the selected operation intensity.

While, if power failure occurs in the commercial A.C. power source 1, the program proceeds to step S106, in which the microprocessor 50 clears timers T1 and T2 (not shown) incorporated thereinto. The timers T1 and T2 are used in determining whether there has occurred a lapse of first and second delay times explained hereinafter.

In steps S108 and S110, it is determined whether or not the output voltage V1 of the first D.C. power detected by the voltage detecting portion 40 is lower than a first reference voltage Vs1, where the first reference voltage Vs1 is a minimal voltage required to drive the compressor 21 at the minimal frequency Fmin.

In case that a momentary power failure, for example, a power interruption for a time interval shorter than one period of commercial A.C. power source 1, occurs in the commercial A.C. power source 1, it is possible to continuously drive the compressor 21 by previously lengthening the discharge time of the smoothing condenser of the first D.C. power generating portion 10. As a result, it is determined whether or not some power failure shorter than a predetermined time interval occurs in commercial A.C. power source 1 in step S110. If output voltage V1 is higher than the first reference voltage Vs1 in step S110, the program proceeds to step S118, in which the microprocessor 50 counts the operation time T1 while starting the compressor 21 at the minimal frequency Fmin.

In step S120, it is determined whether or not a first delay time t1 lapses. The first delay time t1 is needed for preventing the overstrain of the compressor 21 which may occur as the operation frequency of the compressor 21 abruptly changes from the minimal frequency Fmin to the set frequency Fset which may be a maximum frequency. If the first delay time t1 lapses in step S120, the microprocessor 50 drives the compressor 21 at the set frequency Fset via steps S122 to S126.

In case the output voltage V1 is lower than the first reference voltage Vs1 in step S110, that is, the time interval of the power failure in commercial A.C. power source 1 is longer than the predetermined time interval, the microprocessor 50 can not drive the compressor 21 with the first D.C. power without any interruption. Accordingly, the program proceeds to steps S112 and S114, in which the microprocessor 50 determines whether or not the output voltage V2 is lower than the first reference voltage Vs1. If the output voltage V2 is higher than the first reference voltage Vs1 in step S114, the program proceeds to step S116, in which the switch SW1 of the second D.C. power generating portion 60 is turned on.

In steps S118 and S120, the microprocessor 50 determines whether or not the first delay time t1 lapses while driving the compressor 21 at the minimal frequency Fmin. If the first delay time t1 lapses in step S120, the program proceeds to step S122, in which the microprocessor 50 determines whether or not the output voltage V1 of the first D.C. power is lower than a second reference voltage Vs2 at which the compressor 21 may be driven at the maximum frequency. That is, it is determined whether commercial A.C. power source 1 is restored from the power failure in step S122. If the output voltage V1 is higher than the second reference voltage Vs2 in step S122, the program proceeds to step S128, in which the microprocessor 50 turns the switch SW1 off, and then performs the afore-mentioned steps S124 and S126. That is, the microprocessor 50 drives the compressor 21 at the set frequency Fset.

In step S114, if the output voltage V2 is lower than the first reference voltage Vs1, the program proceeds to steps S130 and S132, in which the microprocessor 50 stops the operation of the compressor 21 for a second delay time t2, and then repeatedly performs the step S100 and the subsequent steps.

Here, the second delay time t2 is needed for preventing the overstrain of the compressor 21 which may occur as the operation frequency of the compressor 21 abruptly changes from zero to the set frequency which may be a maximum frequency. Therefore, the second delay time t2 is necessarily greater than the first delay time t1.

I claim:

1. A control apparatus for a compressor of a refrigeration cycle, comprising:

a first power supply means for providing a first D.C. power by rectifying and then smoothing a commercial A.C. power source;

a second power supply means for providing a second D.C. power independently of said first means;

an invertor means for converting one of said first and second D.C. powers into A.C. power having a variable frequency and driving said compressor with said converted A.C. power;

a first detecting means for detecting a failure of said commercial A.C. power source;

a second detecting means for detecting an output voltage of said second D.C. power; and, a control means connected to said first and second detecting means and said invertor means for connecting said second D.C. power to said invertor means to continuously drive said compressor when a magnitude of the output voltage of said second D.C. power is greater than a reference voltage during a failure of said commercial A.C. power source.

2. The control apparatus according to claim 1, wherein said second D.C. power generating means comprises:

a solar cell module;

a DC to DC convertor for stepping D.C. voltage from said solar cell module up/down to D.C. voltage suitable for operating the refrigerator cycle; and a switch means for connecting or disconnecting said stepped up/down D.C. power with respect to said invertor means according to a signal from said control means.

3. The control apparatus according to claim 1, wherein said control means is operable to drive said compressor at a minimum frequency for a delay period when said magnitude of the output voltage of said second D.C. power is greater than said reference voltage during a failure of said commercial A.C. power source, and thereafter drive said compressor at a higher frequency.

4. A control method for an air conditioner which obtains a first D.C. power by rectifying and smoothing commercial A.C. power source, and obtains a second D.C. power from an auxiliary source, and converts the first and second D.C powers into A.C. power having a variable frequency and then drives a compressor of the air conditioner with the converted A.C. power, said method comprising the steps of:

(A) driving said compressor by said first D.C. power;

(B) determining whether a first output voltage of said first D.C. power is higher than a reference voltage capable of driving the compressor at a minimum frequency;

(C) determining whether a second output voltage of said second D.C. power is higher than said reference voltage when said first output voltage is not higher than said reference voltage in step B; and (D) driving said compressor with said second output voltage when said first output voltage is not higher than said reference voltage and said second output voltage is higher than said reference voltage.

5. The control method according to claim 4, wherein step D comprises driving said compressor at a minimum frequency for a delay period, and thereafter driving said compressor at a higher frequency.

6. The control method according to claim 5, including, prior to step D, the step of stopping operation of said compressor for a preset period if both of said first and second output voltages are not higher than said reference voltage.

7. The control method according to claim 4, including generating said second D.C. voltage by a solar cell.

* * * * *